(12) United States Patent
Farthing et al.

(10) Patent No.: US 10,563,695 B2
(45) Date of Patent: Feb. 18, 2020

(54) MULTI-LAYERED SINTERED BUSHINGS AND BEARINGS

(71) Applicant: FEDERAL-MOGUL LLC, Southfield, MI (US)

(72) Inventors: Leslie John Farthing, Rugby (GB); Jens Wellmann, Bergisch Gladbach (DE)

(73) Assignee: Tenneco Inc., Lake Forest, IL (US)

(*) Notice: Subject to any disclaimer, the term of this patent is extended or adjusted under 35 U.S.C. 154(b) by 0 days.

(21) Appl. No.: 15/951,688

(22) Filed: Apr. 12, 2018

(65) Prior Publication Data

US 2018/0298947 A1 Oct. 18, 2018

Related U.S. Application Data

(60) Provisional application No. 62/485,581, filed on Apr. 14, 2017.

(51) Int. Cl.
*F16C 33/02* (2006.01)
*F16C 33/12* (2006.01)
(Continued)

(52) U.S. Cl.
CPC ............ *F16C 33/121* (2013.01); *B22F 5/106* (2013.01); *B22F 7/02* (2013.01); *C22C 38/44* (2013.01);
(Continued)

(58) Field of Classification Search
CPC ...... F16C 17/02; F16C 33/122; F16C 33/124; F16C 33/125; F16C 33/127; F16C 33/128;
(Continued)

(56) References Cited

U.S. PATENT DOCUMENTS 2,227,307 A 12/1940 Hildabolt
2,725,265 A 11/1955 Daniels et al.
(Continued)

FOREIGN PATENT DOCUMENTS

CN 105873699 A 8/2016
EP 1412547 A1 4/2004
(Continued)

OTHER PUBLICATIONS

International Search Report, dated Jul. 23, 2018 (PCT/US2018/027414).

*Primary Examiner* — Phillip A Johnson
(74) *Attorney, Agent, or Firm* — Robert L. Stearns; Dickinson Wright, PLLC

(57) ABSTRACT

A bushing formed of different alloys selected to accommodate different operating conditions is provided. For example, the bushing could include an iron-based alloy in a portion of the bushing exposed to lower temperatures, and a cobalt-based alloy in a portion of the bushing exposed to higher temperatures. The first and second alloys could be axially or radially aligned. The iron based alloy includes 10 to 30 wt % Cr, 0 to 21 wt % Ni, 0 to 10 wt % Mo, 0 to 5 wt % W, 0 to 3 wt % C, 0 to 4 wt % V, 0 to 20 wt % Co, and a balance of Fe; and the cobalt based alloy includes 10 to 30 wt % Cr, 5 to 21 wt % Ni, 0 to 10 wt % Mo, 0 to 10 wt % W, 0 to 3 wt % V, 0.5 to 3 wt % C, and a balance of Co.

18 Claims, 6 Drawing Sheets

(51) Int. Cl.
  *F16C 17/02* (2006.01)
  *B22F 5/10* (2006.01)
  *B22F 7/02* (2006.01)
  *C22C 38/52* (2006.01)
  *C22C 38/44* (2006.01)
  *C22C 38/46* (2006.01)
  *B22F 7/06* (2006.01)
  *B23K 20/12* (2006.01)
  *B23K 103/04* (2006.01)

(52) U.S. Cl.
  CPC .............. *C22C 38/46* (2013.01); *C22C 38/52* (2013.01); *F16C 17/02* (2013.01); *B22F 7/064* (2013.01); *B22F 2301/35* (2013.01); *B23K 20/12* (2013.01); *B23K 2103/05* (2018.08); *F16C 2204/62* (2013.01)

(58) Field of Classification Search
  CPC .............. F16C 33/145; F16C 2204/62; F16C 2204/64; F16C 2204/66; F16C 2204/70; F16C 2204/72; F16C 2360/24; C22C 38/18; C22C 38/20; C22C 38/22; C22C 38/24; C22C 38/30; C22C 38/32; C22C 38/40; C22C 38/42; C22C 38/44; C22C 38/46; C22C 38/52; B22F 5/106; B22F 2301/35
  See application file for complete search history.

(56) References Cited

U.S. PATENT DOCUMENTS

| | | |
|---|---|---|
| 2,775,024 A | 12/1956 | Seal |
| 3,752,003 A | 8/1973 | Dunn et al. |
| 3,761,257 A | 9/1973 | Dunn |
| 3,762,881 A | 10/1973 | Dunn |
| 3,770,332 A | 11/1973 | Dunn |
| 4,054,449 A | 10/1977 | Dunn et al. |
| 4,663,241 A | 5/1987 | Doherty et al. |
| 9,249,830 B2 | 2/2016 | Mouri et al. |
| 9,441,670 B2 | 9/2016 | Mouri et al. |
| 2004/0237712 A1 | 12/2004 | Whitaker et al. |
| 2005/0006006 A1* | 1/2005 | Schall .................. C22C 38/22 148/225 |
| 2008/0146467 A1 | 6/2008 | Takayama |
| 2010/0029517 A1 | 2/2010 | Oboodi et al. |
| 2015/0010254 A1* | 1/2015 | Mouri .................. B22F 5/106 384/279 |
| 2016/0215820 A1 | 7/2016 | Sugai et al. |
| 2016/0312668 A1 | 10/2016 | Hunsche et al. |
| 2016/0348722 A1 | 12/2016 | Mouri et al. |
| 2017/0023059 A1* | 1/2017 | Ito .................. F16C 17/026 |
| 2017/0045136 A1 | 2/2017 | Taga et al. |
| 2017/0067472 A1* | 3/2017 | Day .................. F16C 17/04 |

FOREIGN PATENT DOCUMENTS

| | | |
|---|---|---|
| EP | 2154385 A1 | 2/2010 |
| GB | 1336519 A | 11/1973 |
| JP | S63254221 A | 10/1988 |
| JP | H07150913 A | 6/1995 |

* cited by examiner

FIG. 11G  FIG. 11H

MULTI-LAYERED SINTERED BUSHINGS AND BEARINGS

CROSS-REFERENCE TO RELATED APPLICATION

This U.S. Utility patent application claims priority to U.S. provisional patent application No. 62/485,581, filed Apr. 14, 2017, the entire disclosure of which is incorporated herein by reference.

BACKGROUND OF THE INVENTION

1. Technical Field

This invention relates generally to powder metal sintered bushings and bearings for high temperature applications, such as 250° C. and above.

2. Related Art

Sintered powder metal bushings and bearings for high temperature applications such as turbochargers often see a wide range of temperatures and environments. For example, a given bushing may, in use, experience a very high temperature in one region of the bushing while being subjected to a considerably lower temperature in other regions. The same applies to wear, in which some portions are exposed to higher wear environments while other regions are exposed to relatively less wear. Traditionally, the bearing or bushing is designed as a compromise. A number of factors are taken into account and the appropriate material is selected to produce the bearing or bushing. These factors may include thermal and mechanical properties, oxidation and corrosion resistance, and wear resistance, over a wide range of temperatures. This may result in a portion of the bushing or bearing being subject to operating conditions for which the alloy composition is under-designed. Or, more commonly, the entire bushing or bearing has to be overdesigned in order to guarantee adequate performance in all the different operating conditions experienced along its length.

SUMMARY

The invention provides a sintered powder metal bearing or bushing that has at least a first region made of a first alloy material and a second region made of a second alloy material different than that of the first.

The bushing or bearing extends circumferentially and axially. If a bushing, it may be generally tubular with a generally cylindrical outer surface and a generally tubular inner surface and may extend axially between opposite ends. The first and second regions may be axially disposed relative to one another, such that the first region may be near one end of the bushing and the second region near the opposite end. The first end may represent a "hot" end of the bushing that is subject to high temperatures and the alloy used for the hot end is selected to be suitable for high temperature environments. The second end may represent a "cool" end of the bushing that is subject to lower temperatures and the alloy of the second region is different than the alloy of the first region and better suited for cool environments.

Other arrangements are possible, wherein there may be three or more regions axially arranged relative to one another. For example, a bushing or bearing may experience more wear or higher mechanical stress near the opposite axial ends and may be formed from a first alloy that performs well under these conditions, whereas the second region axially between and separating the first regions may be formed of a second alloy different than the first alloy and better suited for the lower wear or lower stress environment of the middle portion of the bearing or bushing.

The invention also contemplates radial variations wherein, for example, a bushing may have high wear or temperature on an inner surface and lower wear or temperature on an outer surface, such that the radially inner first region layer is made from a first sintered powder metal alloy that performs well under high wear and/or temperature, and the radially outer second region layer is made from a second sintered powder metal layer that is better suited for lower temperature and/or wear.

The invention contemplates the alloy of one of the regions being selected as a high alloy iron and/or cobalt based material. High alloy preferably means having an alloy content >10 wt % alloy elements by weight. The alloys may include, for example, a formulation based on 410L stainless steel. The invention further contemplates higher alloy additions, wherein the alloy content may exceed 25 wt % or even 30 wt % by weight, such as a formulation based on 316 stainless steel. The alloy of the other region may have a lower alloy content than the first material, and a performance which may be suitable for the operating environment that this region of the bushing/bearing will see in use (e.g., different operating temperature and/or different mechanical stresses). Or the alloy of the other region may have a similar alloy content to the first material, but with a different combination of alloying elements to give performance better suited to that specific operating environment.

The invention contemplates making these multilayer bearing/bushings by a number of possible manufacturing techniques. One approach involves pressing different powders together (representative of the alloys of the first and second regions) into a combined compact, followed by sintering. Alternatively, the first and second regions could be compacted separately and then united during sintering, in a process commonly known as sinter bonding. This bonding could also be encouraged by the presence of a special active layer which brazes the parts together, in a process commonly called sinter brazing. Still another approach is to compact and sinter each of the first and second regions and then join them together by welding, for example friction welding.

The multilayer materials according to the invention enable the designer of the bushing or bearing to select the best material for each localized environment of the bushing or bearing, using different alloy formulations individually formulated for the different localized operating environments. For example, if a bushing for a particular application (e.g., turbocharger) was prone to hot end wear at temperatures >700° C., such a first end region could be made from a high alloy sintered powder material that would correspond to an appropriate material for that condition. The opposite second end may be relatively cold in comparison, say <400° C., so this end region could be made of a different high alloy sintered metal material formulated to give good performance in this specific operating environment. There may be a middle third region that may benefit from yet a different alloy and that could be employed and joined in situ or post sintering to the first and second regions. In the bushing example, the regions would preferably be axial but could be radial depending upon the application.

One aspect of the invention provides a bushing comprising a body extending axially along a longitudinal axis between opposite ends and radially from an outer surface to an inner surface. The body includes a first material and a second material different from the first material. The first material is an iron-based material including 10 to 30 wt % Cr, 0 to 21 wt % Ni, 0 to 10 wt % Mo, 0 to 5 wt % W, 0 to 3 wt % C, 0 to 4 wt % V, 0 to 20 wt % Co, and Fe, based on the total weight of said first material.

Another aspect of the invention provides a bushing comprising a body extending axially along a longitudinal axis between opposite ends and radially from an outer surface to an inner surface. The body includes a first material and a second material different from the first material, and the first and second materials are radially aligned.

Yet another aspect of the invention provides a turbocharger presenting a bore and including a bushing disposed in the bore.

Another aspect of the invention provides a method of manufacturing a bushing. The method comprises the step of joining a first material to a second material different from the first material, the first material being an iron-based material including 10 to 30 wt % Cr, 0 to 21 wt % Ni, 0 to 10 wt % Mo, 0 to 5 wt % W, 0 to 3 wt % C, 0 to 4 wt % V, 0 to 20 wt % Co, and Fe, based on the total weight of the first material.

Yet another aspect of the invention provides a method of manufacturing a bushing, comprising the step of joining a first material to a second material different from the first material, wherein the second material is radially aligned with the first material.

BRIEF DESCRIPTION OF THE FIGURES

These and other features and advantages of the invention will be readily understood when considered in connection with the following detailed description and drawings, in which:

FIGS. 11g-11h are schematic views illustrating profiles that could be used to give easier alignment during assembly prior to sinter bonding or sinter brazing

DETAILED DESCRIPTION OF PREFERRED EMBODIMENTS

Figure 1:
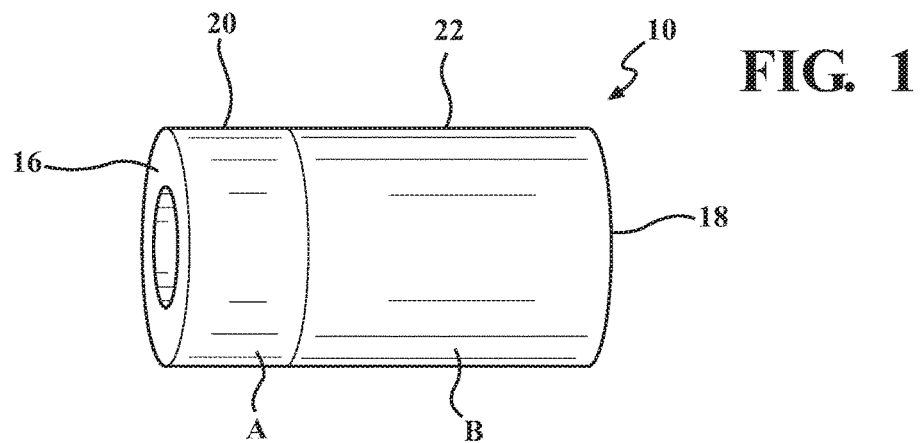
FIG. 1 is a perspective view of a first embodiment of a multi-layer bushing.
Figure 4:
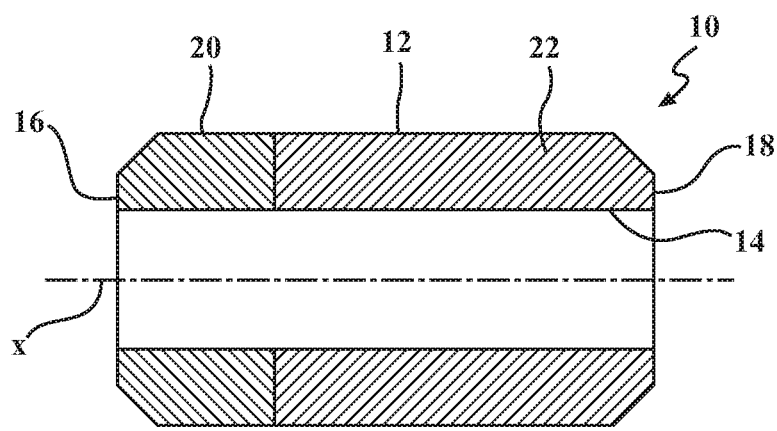
FIG. 4 is a cross sectional view of the bushing of FIG. 1 taken along its longitudinal axis.
Figure 7:
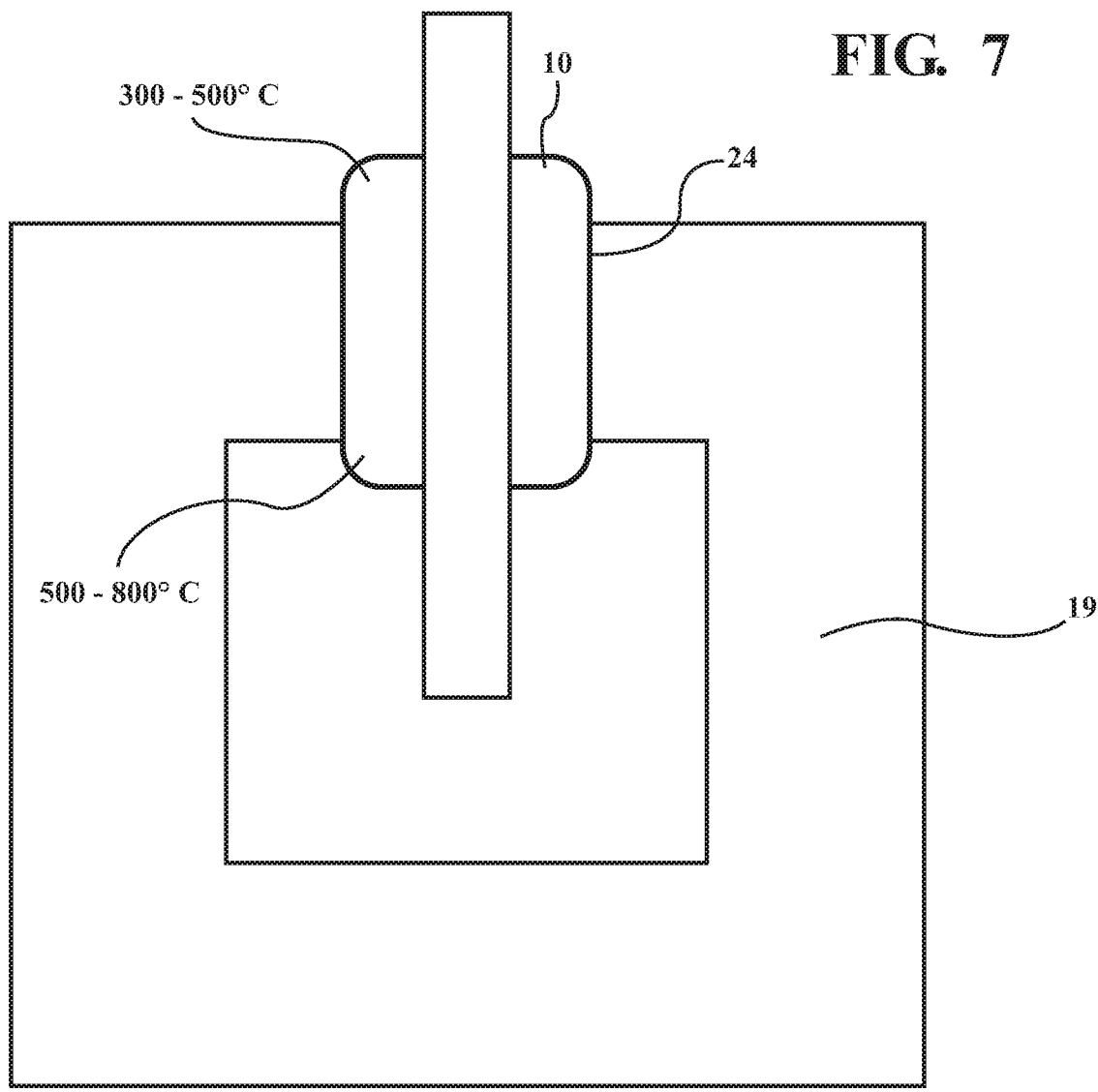
FIG. 7 is a schematic view of a turbocharger environment with a bushing installed, illustrating the temperature extremes typically experienced by the bushing along its axial length.

FIGS. 1 and 4 illustrate a first embodiment of a bushing 10. The bushing 10 has a generally tubular shape with an outer surface 12 that is generally cylindrical and in inner surface 14 that is also generally cylindrical and spaced radially inward of the outer surface 12. The bushing 10 extends axially along a longitudinal axis X between opposite ends 16, 18. One or both ends 16, 18 may be chamfered, or have other machined features present on the end faces and/or the outside diameter and/or the inside diameter. The bushing 10 may be installed, for example, in a turbocharger 19 for an internal combustion engine as illustrated in FIG. 7.

The bushing 10 is fabricated of sintered powdered metal of at least two different alloy materials. The bushing 10 has a first axial portion 20 and a second axial portion 22. The first axial portion is made from a first sintered metal alloy of material A and the second portion is made from a second sintered metal alloy of material B that is of a different from that of material A in composition and/or properties. The alloys of materials A and B are preferably iron based alloys and/or cobalt based alloys. The alloys of materials A and B of portions 20, 22 will have different compositions and/or microstructure, and could also receive different process treatments (heat treatment, coatings, surface finish, etc.) to yield different properties, and may have the same or different lengths, and the same or different thicknesses or inner or outer diameters. The different properties could include wear resistance, thermal & mechanical properties, oxidation & corrosion resistance, combinations of these properties, or others.

As illustrated in FIGS. 1 and 4, the portions 20, 22 of the bushing 10 may be of unequal length. The length of material A in the first portion 20 may range from 5-95% of the overall length of the bushing 10, with the material B of the second portion 22 occupying the balance. For example, material A could occupy about 25% and material B could occupy 75% of the overall length of the bushing 10.

A bushing 10 of the type illustrated in FIGS. 1 and 4 and described herein would have use in any application where different axial portions of the bushing 10 are under varying conditions when in use such that it would be desirable to have in one given axial region a sintered powdered metal material having a desired set of properties that would be best suited for that particular localized environment, and where in another axial portion of the bearing 10 it would be desirable to have a sintered powder material having different properties best suited for the other localized environment. One such example is bushings for turbocharger devices of the type used in internal combustion engine applications. FIG. 7 shows a portion of the turbocharger 19 and the bushing 10 is shown installed in a bore 24 of the turbocharger 19. This bushing 10 has an axial length of 25 mm. The lower end of the bushing 10 is exposed to the hot gases of the turbocharged environment and thus it sees a very high temperature, ranging from 500° C. to about 800° C. depending upon the particular turbocharger, application and usage. In comparison, the opposite upper end is isolated from the intense heat and sees temperatures ranging from about 300° C. to 500° C. As such, in the span of 25 mm, the opposite end regions of the bushing 10 see a temperature swing differential of about 200° C. to 300° C. It will be appreciated that sintered powder metal materials that would be suitable for an operating environment of 300-500° C. at the lower temperature region of the bushing 10 would not necessarily perform as well at the higher temperature regions of 500° C. to 800° C. In a typical design setting, the engineer would consider several factors, especially the maximum temperature, and select a single sintered metal material that would satisfy both environments. In other words, one may have to compromise on the selection of material, taking into account many local environmental factors and the associated performance of candidate materials. With the multi-layer axial bushing of FIGS. 1 and 4, such compromises are substantially minimized. Instead of selecting the best compromise material that would suffice for all localized environments, one could look at the lower temperature region as the first axial portion of the bushing 10 and the higher temperature region as the second axial portion of the bushing and individually select the sintered powder metal material that is best suited for each specialized environment in the manufacture of the dual material bushing 10, as in the present embodiment. The material A for the first portion 20 would typically be a different alloy than the material B for the second portion 22, but it is contemplated that the materials may even be the same chemical composition but the microstructures may be substantially different to yield the desired different properties, depending upon the application involved. In the present embodiment, one could select a cobalt based material for the "hot" region of the bushing 10 and iron based material for the "cool" region of the bushing 10. The cobalt based material could include 20-30 wt % Cr, 5-15 wt % Ni, 5-10 wt % W, and 0.5-1.5 wt % C as the main alloying elements. The iron based material could include 10-20 wt % Cr, 5-15 wt % Ni, 1-5 wt % Mo, and 1-2 w % C as the main alloying elements. The formulation of the cobalt based material is able to accommodate the localized high temperature operating environment, whereas the different composition of the iron based material is suitable for the localized low temperature operating environment. The beneficial properties of the cobalt based material that make it suitable for the hotter first axial portion include high-temperature wear resistance, and oxidation and corrosion resistance. The beneficial properties of the iron based material that make it suitable for the colder second axial portion include good mechanical and thermal properties together with sufficient wear resistance. It will be seen that properties of the desired material for the cooler region may not be a good choice for the hotter region since this material could suffer excessive oxidation or corrosion at high temperatures, and the high temperature wear resistance could also be inadequate leading to premature failure of the bushing component.

The materials for high temperature regions may be high alloy transition metals. These are preferably iron and/or cobalt based sintered powder metal alloys. By high alloy, it is meant that the content of the alloy addition to the iron and/or cobalt base is at least 10 wt %, more preferably at least 25 wt %, and may even exceed 35 wt %. The alloying elements may be incorporated as pre-alloyed in the main powder used in the pressing mix before sintering, or they may be incorporated as separate elements or master alloys mixed into the pressing mix before sintering, or a combination of any such techniques. During sintering, the alloying elements then become redistributed to give the desired sintered microstructure. Apart from the iron and/or cobalt, the other alloying elements preferably include: 10-30 wt % Cr, 0-25 wt % Ni, 0-10 wt % Mo, 0-8 wt % W, 0-4 wt % V, 0.5-3.0 wt % C. Other alloying elements may also be present, depending on the specific operating environment.

The iron based alloy or material includes a balance of iron. In other words, the remaining portion of the iron based alloy or material is formed of iron, so that the total contents of the alloy or material equal 100 wt %. The cobalt based alloy or material includes a balance of cobalt. In other words, the remaining portion of the cobalt based alloy or material is formed of cobalt, so that the total contents of the alloy or material equal 100 wt %.

In one example iron based material, the principal alloying elements could be 15-25 wt % Cr, 0-5 wt % Ni, 1.5-6.5 wt % Mo, 1-4 wt % W, 1-3 wt % V, 0.5-2.5 wt % C. A more preferable composition is 18-24 wt % Cr, 0-5 wt % Ni, 1.5-6.5 wt % Mo, 1-4 wt % W, 1-3 wt % V, 0.8-2.4 wt % C.

In one example iron based material, the principal alloying elements could be 10-25 wt % Cr, 7-20 wt % Ni, 1-7 wt % Mo, 0-3 wt % W, 0-3 wt % V, 0.5-3 wt % C. In this material, the high Ni content serves to improve high temperature properties such as oxidation resistance and wear resistance. A more preferable composition is 13-25 wt % Cr, 7-20 wt % Ni, 1-7 wt % Mo, 0-2 wt % W, 0-2 wt % V, 1-3 wt % C.

In one example iron based material, the principal alloying elements could be 10-25 wt % Cr, 10-21 wt % Ni, 2-10 wt % Mo, 0-3 wt % W, 0-2 wt % V, 4-20 wt % Co, 0.5-2 wt % C. In this material, the combination of high Ni and high Co contents serves to still further improve high temperature properties such as oxidation resistance and wear resistance. A more preferable composition is 13-25 wt % Cr, 10-21 wt % Ni, 2-10 wt % Mo, 0-3 wt % W, 0-2 wt % V, 4-20 wt % Co, 0.8-1.6 wt % C.

In one example cobalt based material, the principal alloying elements could be 20-30 wt % Cr, 5-15 wt % Ni, 0-3 wt % Mo, 5-10 wt % W, 0-3 wt % V, 0.5-2 wt % C. In this material, use of the cobalt alloy matrix serves to still further improve high temperature properties such as oxidation resistance and wear resistance. A more preferable composition is 20-30 wt % Cr, 5-15 wt % Ni, 0-2 wt % Mo, 5-10 wt % W, 0-2 wt % V, 0.5-1.5 wt % C.

Figure 2:
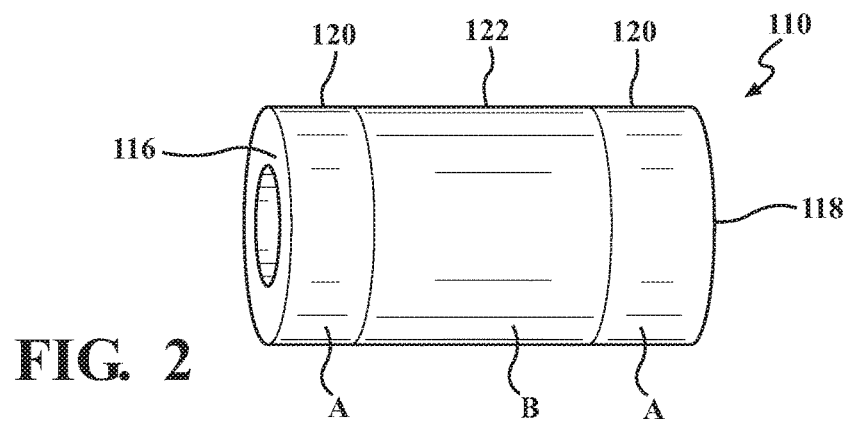
FIG. 2 is a perspective view of a second embodiment of a multi-layer bushing.
Figure 5:
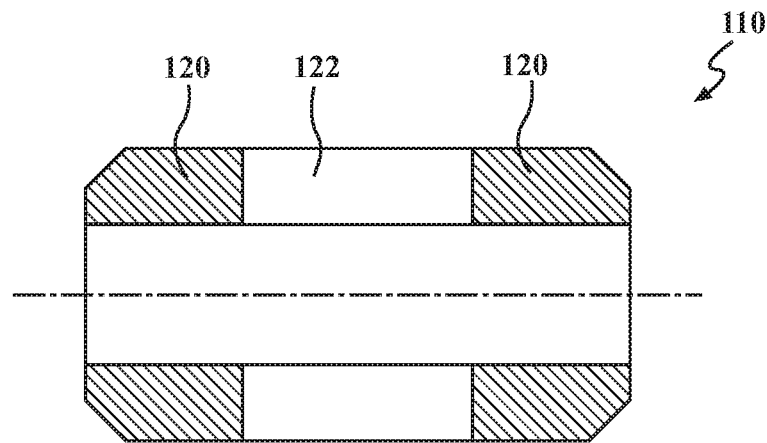
FIG. 5 is a cross sectional view of the bushing of FIG. 2 taken along its longitudinal axis.
Figure 8:
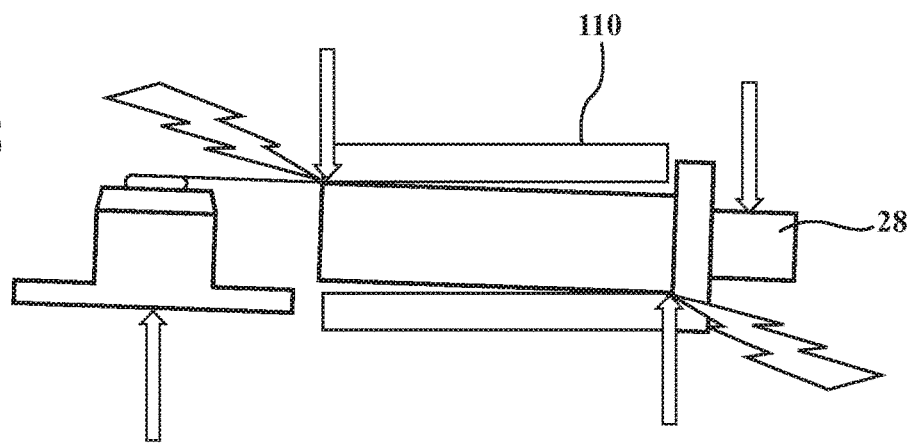
FIG. 8 is a schematic cross sectional view illustrating a bushing installed in an environment where variable loading and wear conditions are imparted to the bushing.

FIGS. 2, 5 and 8 illustrate another embodiment of a multi-axial layer bushing 110. The same reference numerals as used in connection with the first embodiment apply here except are offset by 100. This bushing includes three distinct axial regions wherein the sintered powder metal alloy material of each region is best suited for the localized environment associated with each region. It is noted that the three regions could all be different wherein three unique sintered powder metal alloys would be used. Or, as illustrated in FIG. 8, the regions at the ends of the bushing may have a common localized environment that is different than a middle region that separates the end regions. In the illustrated end use of FIG. 8, the bushing 110 is shown supporting a shaft 28 that is side loaded, imparting uneven loading of the bushing 110 such that the axial end portions 120 see a greater mechanical load and are thus subject to greater wear than the middle portion 122. Knowing that the bushing 110 for this particular application will be subject to such a variable load/wear environment, the bushing 110 can be designed with the axial end portions 120 fabricated in a different sintered powder metal alloy than that used for the middle portion 122. As described above for the embodiment of FIGS. 1 and 4, the different portion will have different alloy compositions and/or microstructure, and could also receive different process treatments (heat treatment, coatings, surface finish, etc.) to yield different properties. In most cases, the difference will include a variation in the composition of the alloys of the materials used for the various regions. For the illustrated end loading application of FIG. 8, the material A of the high load/high end regions 120 would include materials that exhibit properties of high wear resistance under high mechanical load, such as an iron based alloy with 15-25 wt % Cr, 2-5 wt % Mo, 2-5 wt % W, 1-3 wt % V and 1.5-2.5 wt % C as the main alloying elements, whereas the material B selected for the low load/low wear middle region may be a lower alloy material that does not require such high load/wear properties, such as an iron based alloy with 10-15 wt % Cr and 0.5-1.5 wt % C as the main alloying elements.

Figure 6:
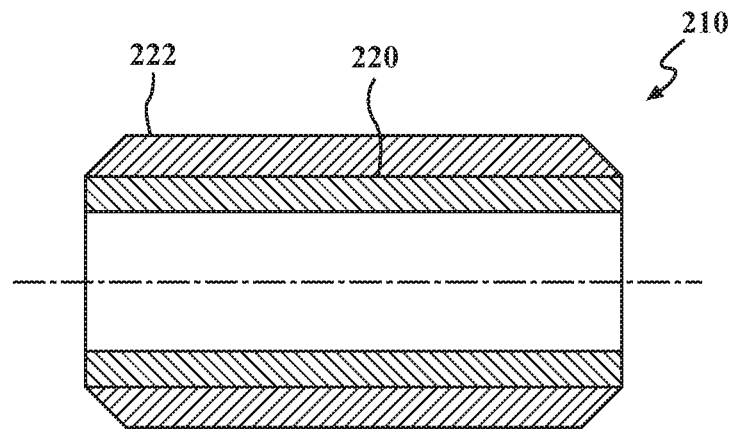
FIG. 6 is a cross sectional view of the bushing of FIG. 3 taken along its longitudinal axis.

There may be other applications where localized environments are encountered by the bushing, but instead of the environments being axially arranged, such as in a turbocharger or side load environment described above, the distinct environments are arranged in the radial direction of the bushing. In such cases, a bushing can be produced similar to above, but where the different portions are radially disposed instead of axially disposed. Such a bushing 210 is illustrated schematically in FIGS. 3 and 6. In this example, the inner surface region 220 may experience higher loading or higher temperature or combinations thereof that would call for a high alloy powder metal sintered material, whereas a radially outer layer region 222 may see lower loading or lower temperatures or combinations thereof, that would call for a different sintered powdered metal alloy than that used for the inner surface radial region 220. In other applications, the critical feature of the inner radial region 220 may be its tribological compatibility with a shaft material or surface finish, rather than simply its ability to tolerate high temperatures and/or high mechanical loads. In this case, the outer radial region 222 may then be selected on the basis of its superior mechanical properties, where these are required to give mechanical support to the inner radial region. The same materials identified above in connection with the embodiments of FIGS. 1-2 may be suitable for use in the layers of the radial multi-layer bushing 210 of FIGS. 3 and 6.

Figure 3:
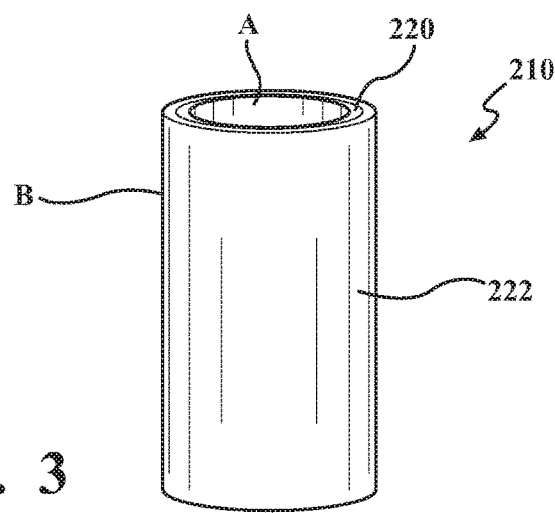
FIG. 3 is a perspective view of a third embodiment of a multi-layer bushing.

Different processes can be used to manufacture the bushings of FIGS. 1-3.

Figure 10:
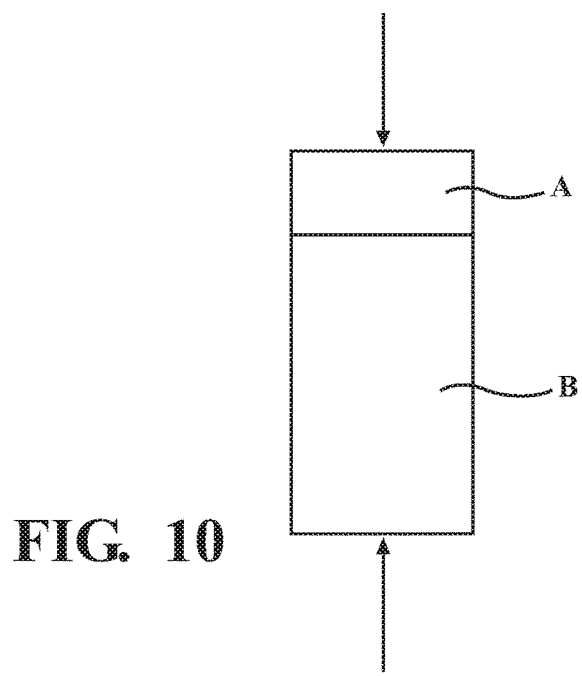
FIG. 10 is a schematic view illustrating multi-layer pressing of different powder metal alloy materials for making the bushings or bearings.

FIG. 10 illustrates a process wherein the different alloy powders of selected materials A and B are pressed concurrently in a first operation and then sintered as a single pressed part. This could be two, three or more layers and may be best suited for the axial layered bushings 10, 110, although not excluded for use in making the radial layered bushings 210.

Figure 11C:
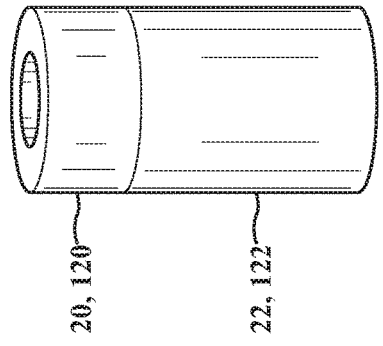
FIGS. 11a-11c are schematic views illustrating sinter brazing of the axial multi-layer bushings and bearings.
Figure 11B:
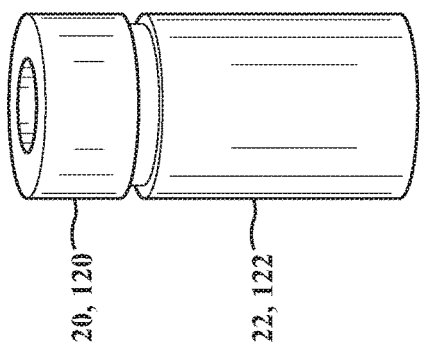
Figure 11A:
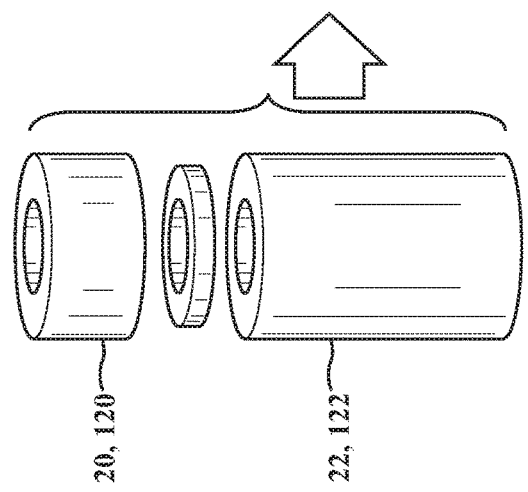
Figure 11F:
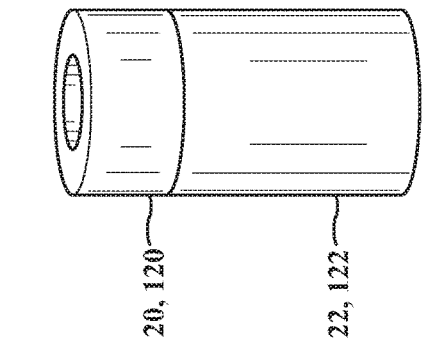
FIGS. 11d-11f are schematic views illustrating sinter bonding of the axial multi-layer bushings and bearings, with no special braze addition.
Figure 11E:
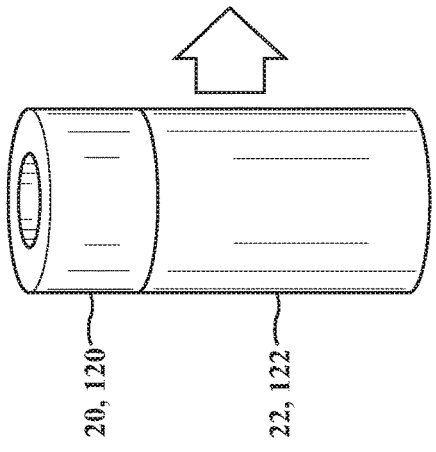
Figure 11D:
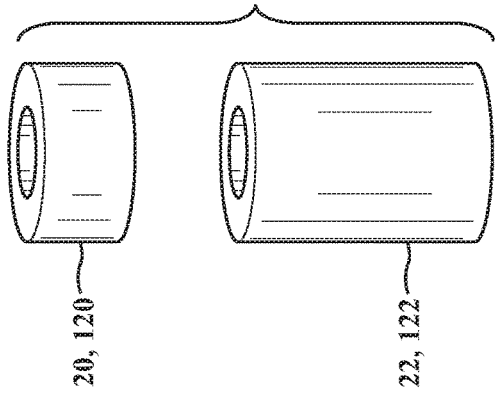

FIGS. 11a-c illustrate an alternative process wherein the portions 20, 22; 120,122 are individually pressed, perhaps then partially sintered at a temperature lower than the ultimate sintering temperature, and then subsequently joined by the process known as sinter brazing. The ends to be joined can either be flat, or they could be profiled so they nest to assist with pre-alignment of the portions prior to sinter brazing, as illustrated in FIGS. 11g-h. Sinter brazing could likewise be used for making the radial layered bushings 210 and contoured features could similarly be added to assist with alignment ahead of sinter brazing.

Referring still to FIGS. 11a-f, an alternative process is contemplated wherein the portions 20, 22; 120,122 are individually pressed, perhaps then partially sintered at a temperature lower than the ultimate sintering temperature, and then subsequently joined by the process known as sinter bonding in which no brazing addition is present. The ends to be joined can either be flat or could be profiled so they nest to assist with pre-alignment of the portions prior to sinter bonding, as illustrated in FIGS. 11g-h. Sinter bonding could likewise be used for making the radial layered bushings 210 and contoured features could similarly be added to assist with alignment ahead of sinter bonding.

Figure 12A:
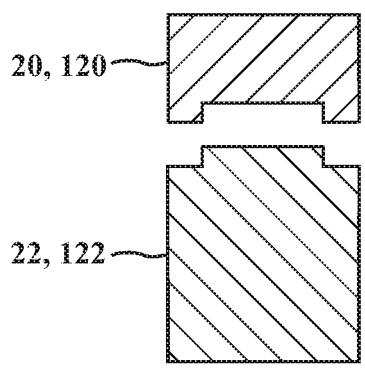
FIGS. 12a-b are schematic views illustrating friction welding of the axial multi-layer bushing or bearing.
Figure 12A:
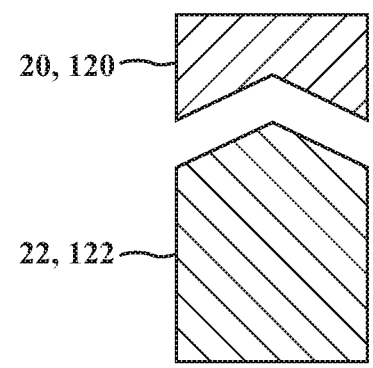
Figure 12A:
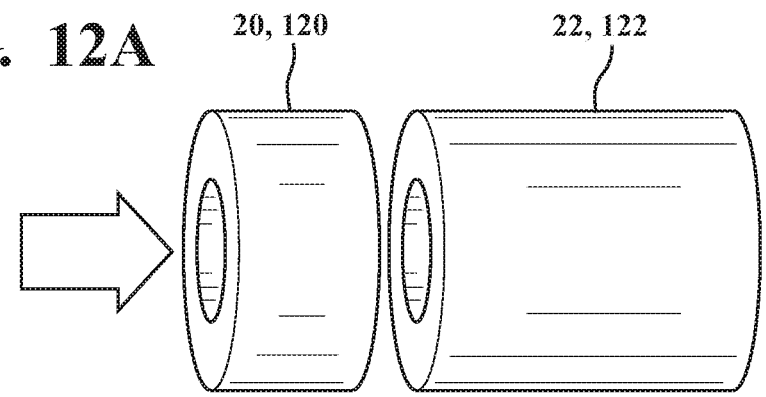
Figure 12B:
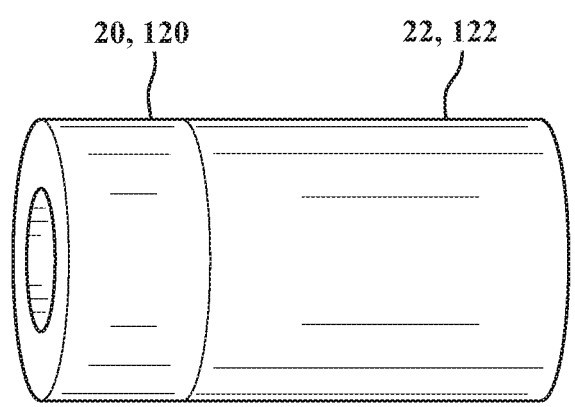

FIGS. 12a-b illustrate yet another process, wherein the portions 20, 22; 120; 122 are individually pressed and sintered and subsequently joined by friction welding. Here, adjacent end faces of the portions may be brought into engagement while being moved relative to one another with sufficient force and movement to generate enough frictional heat to bond the portions at the interface. It is believed that this process would be well suited for the axial layered bushings 10, 110, although not excluded for use in joining the radial layered bushings 210.

Figure 9A:
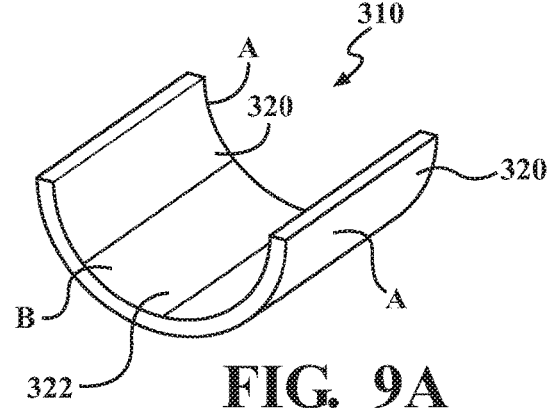
FIGS. 9a and 9b are perspective views of alternative multi-layer bearing constructions showing axial and radial layers, respectively.
Figure 9B:
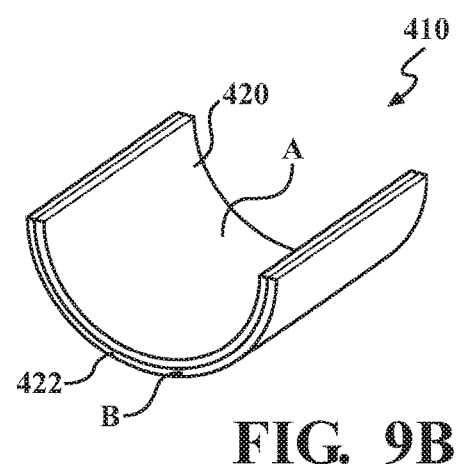

FIGS. 9a and 9b illustrate bearings 310, 410 that can be made in similar manner. The embodiment of 9a shows a half shell bearing 310 of sintered powder metal material, wherein axially spaced end portions 320 are made of material A and middle portion 322 is made of material B and bridges the end portions 320. The materials A and B may be the same sintered powdered metal materials as those described above in connection with making a bushing, or may be different depending on the particular application. The axial regions represent localized environments of the bearing that would call for different materials as for reasons already explained in connection with the bushings above. The embodiment of FIG. 9b is similar to 9a except that the layers 420, 422 are arranged radially (in a manner similar to the bushing 210 of FIG. 3).

The above description is exemplary of the present invention, and those of ordinary skill in the art will understand and appreciate that other variations and embodiments are possible in light of the above teachings and are contemplated and incorporation herein.

What is claimed is:

1. A bushing, comprising:
    a body extending axially along a longitudinal axis between opposite ends and radially from an outer surface to an inner surface,
    said body including a first material and a second material different from said first material, and
    said first material is an iron-based material including 10 to 30 wt % Cr, 0 to 21 wt % Ni, 0 to 10 wt % Mo, 0 to 5 wt % W, 0 to 3 wt % C, 0 to 4 wt % V, 0 to 20 wt % Co, and Fe, based on the total weight of said first material.

2. The bushing according to claim 1, wherein said first material and said second material are radially aligned or axially aligned.

3. The bushing according to claim 1, wherein said second material is a cobalt based material.

4. The bushing according to claim 3, wherein said cobalt based material includes 10 to 30 wt % Cr, 5 to 21 wt % Ni, 0 to 10 wt % Mo, 0 to 10 wt % W, 0 to 3 wt % V, 0.5 to 3 wt % C, and Co, based on the total weight of said cobalt based material.

5. The bushing according to claim 3, wherein said cobalt based material includes 20 to 30 wt % Cr, 5 to 15 wt % Ni, 0 to 3 wt % Mo, 5 to 10 wt % W, 0 to 3 wt % V, 0.5 to 2 wt % C, and Co, based on the total weight of said cobalt based material.

6. The bushing according to claim 3, wherein said cobalt based material includes 20 to 30 wt % Cr, 5 to 15 wt % Ni, 0 to 2 wt % Mo, 5 to 10 wt % W, 0 to 2 wt % V, 0.5 to 1.5 wt % C, and Co, based on the total weight of said cobalt based material.

7. The bushing according to claim 3, wherein said cobalt based material includes 20 to 30 wt % Cr, 5 to 15 wt % Ni, 5 to 10 wt % W, and 0.5 to 1.5 wt % C, based on the total weight of said cobalt based material; and said iron based material includes 10 to 20 wt % Cr, 5 to 15 wt % Ni, 1 to 5 wt % Mo, and 1 to 2 wt % C, based on the total weight of said iron based material.

8. The bushing according to claim 1, wherein said second material is an iron based material different from said first material.

9. The bushing according to claim 1, wherein said first material includes 15 to 25 wt % Cr, 0 to 5 wt % Ni, 1.5 to 6.5 wt % Mo, 1 to 4 wt % W, 1 to 3 wt % V, and 0.5 to 2.5 wt % C, based on the total weight of said first material.

10. The bushing according to claim 1, wherein said first material includes 18 to 24 wt % Cr, 0 to 5 wt % Ni, 1.5 to 6.5 wt % Mo, 1 to 4 wt % W, 1 to 3 wt % V, and 0.8 to 2.4 wt % C, based on the total weight of said first material.

11. The bushing according to claim 1, wherein said first material includes 10 to 25 wt % Cr, 7 to 20 wt % Ni, 1 to 7 wt % Mo, 0 to 3 wt % W, 0 to 3 wt % V, and 0.5 to 3 wt % C, based on the total weight of said first material.

12. The bushing according to claim 1, wherein said first material includes 13 to 25 wt % Cr, 7 to 20 wt % Ni, 1 to 7 wt % Mo, 0 to 2 wt % W, 0 to 2 wt % V, and 1 to 3 wt % C, based on the total weight of said first material.

13. The bushing according to claim 1, wherein said first material includes 10 to 25 wt % Cr, 10 to 21 wt % Ni, 2 to 10 wt % Mo, 0 to 3 wt % W, 0 to 2 wt % V, 4 to 20 wt % Co, and 0.5 to 2 wt % C, based on the total weight of said first material.

14. The bushing according to claim 1, wherein said first material includes 13 to 25 wt % Cr, 10 to 21 wt % Ni, 2 to 10 wt % Mo, 0 to 3 wt % W, 0 to 2 wt % V, 4 to 20 wt % Co, and 0.8 to 1.6 wt % C, based on the total weight of said first material.

15. The bushing according to claim 1, wherein said bushing has a tubular shape,
said second material is a cobalt based material including 10 to 30 wt % Cr, 5 to 21 wt % Ni, 0 to 10 wt % Mo, 0 to 10 wt % W, 0 to 3 wt % V, 0.5 to 3 wt % C, and Co, based on the total weight of said cobalt based material,
said first and second materials are sintered powdered metal,
said second material has a composition, microstructure and/or properties different from said first material, and
said first material has an axial length ranging from 5 to 95% of the overall length of said bushing.

16. The bushing according to claim 1 including a third material different form said first material and/or said second material.

17. The bushing according to claim 16, wherein said first and third materials are located at axial ends of said bushing; said second material is located between said first and third materials; said first and third materials are an iron based material including 15 to 25 wt % Cr, 2 to 5 wt % Mo, 2 to 5 wt % W, 1 to 3 wt % V, and 1.5 to 2.5 wt % C, based on the total weight of said iron based material; and said second material is an iron based material including 10 to 15 wt % Cr and 0.5 to 1.5 wt % C, based on the total weight of said second material.

18. A turbocharger presenting a bore and including a bushing disposed in said bore, said bushing including a body extending axially along a longitudinal axis between opposite ends and radially from outer surface to an inner surface,
said body including a first material and a second material different from said first material, and
said first material is an iron-based material including 10 to 30 wt % Cr, 0 to 21 wt % Ni, 0 to 10 wt % Mo, 0 to 5 wt % W, 0 to 3 wt % C, 0 to 4 wt % V, 0 to 20 wt % Co, and Fe, based on the total weight of said first material.

* * * * *